Figure 1:
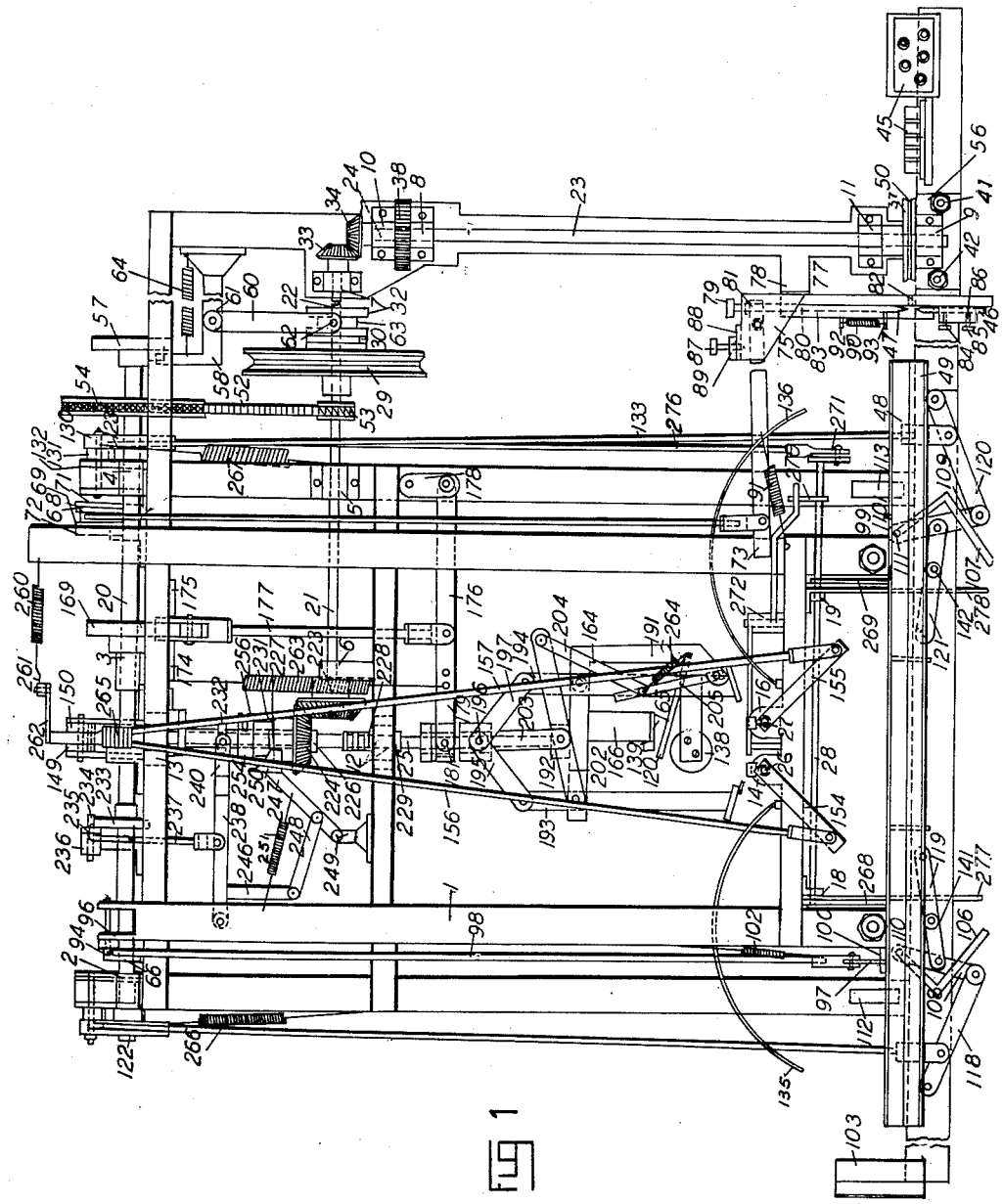

Jan. 1, 1963    H. H. THOMPSON    3,071,167
MACHINE FOR MAKING WIRE GARMENT HANGERS
Filed Dec. 28, 1959    5 Sheets-Sheet 2
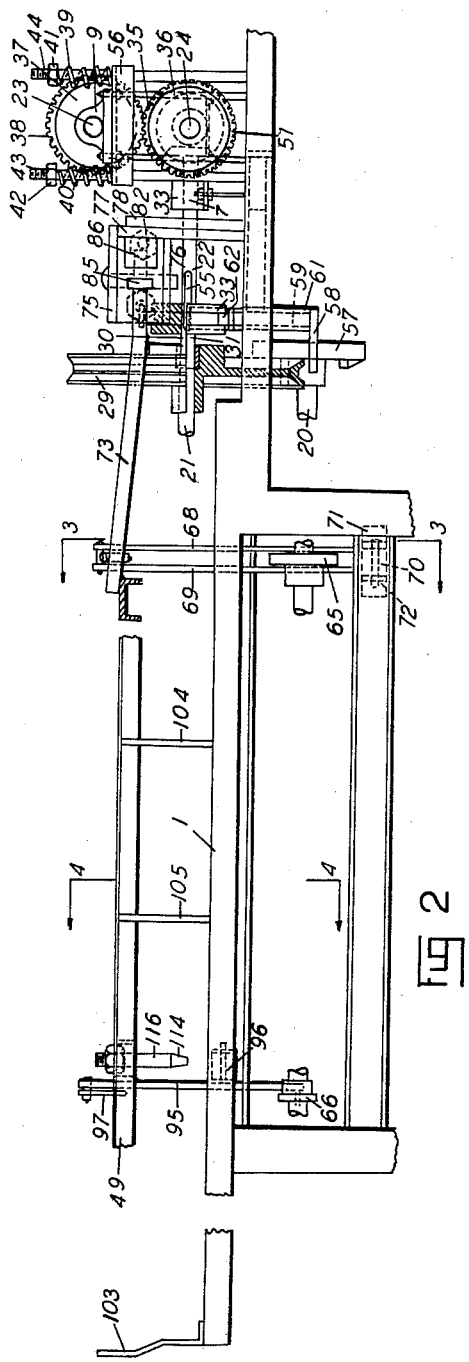
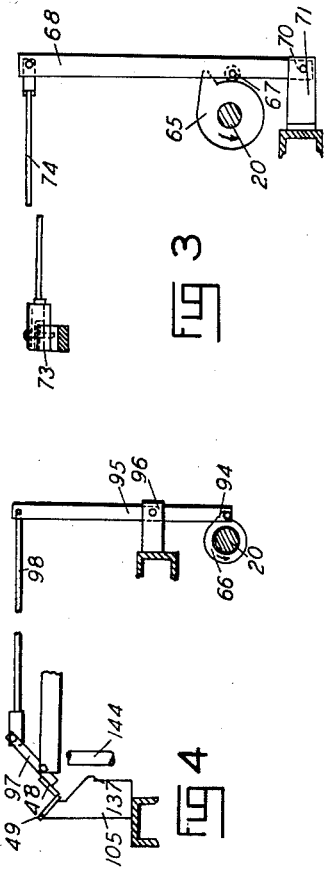
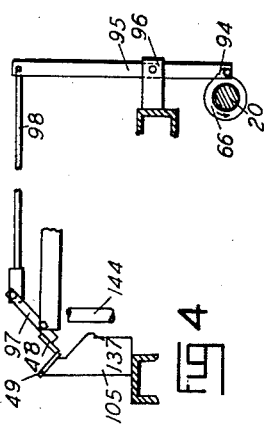
INVENTOR.
Henry H. Thompson
BY Chas. Denegre
Attorney Jan. 1, 1963 H. H. THOMPSON 3,071,167
MACHINE FOR MAKING WIRE GARMENT HANGERS
Filed Dec. 28, 1959 5 Sheets-Sheet 3
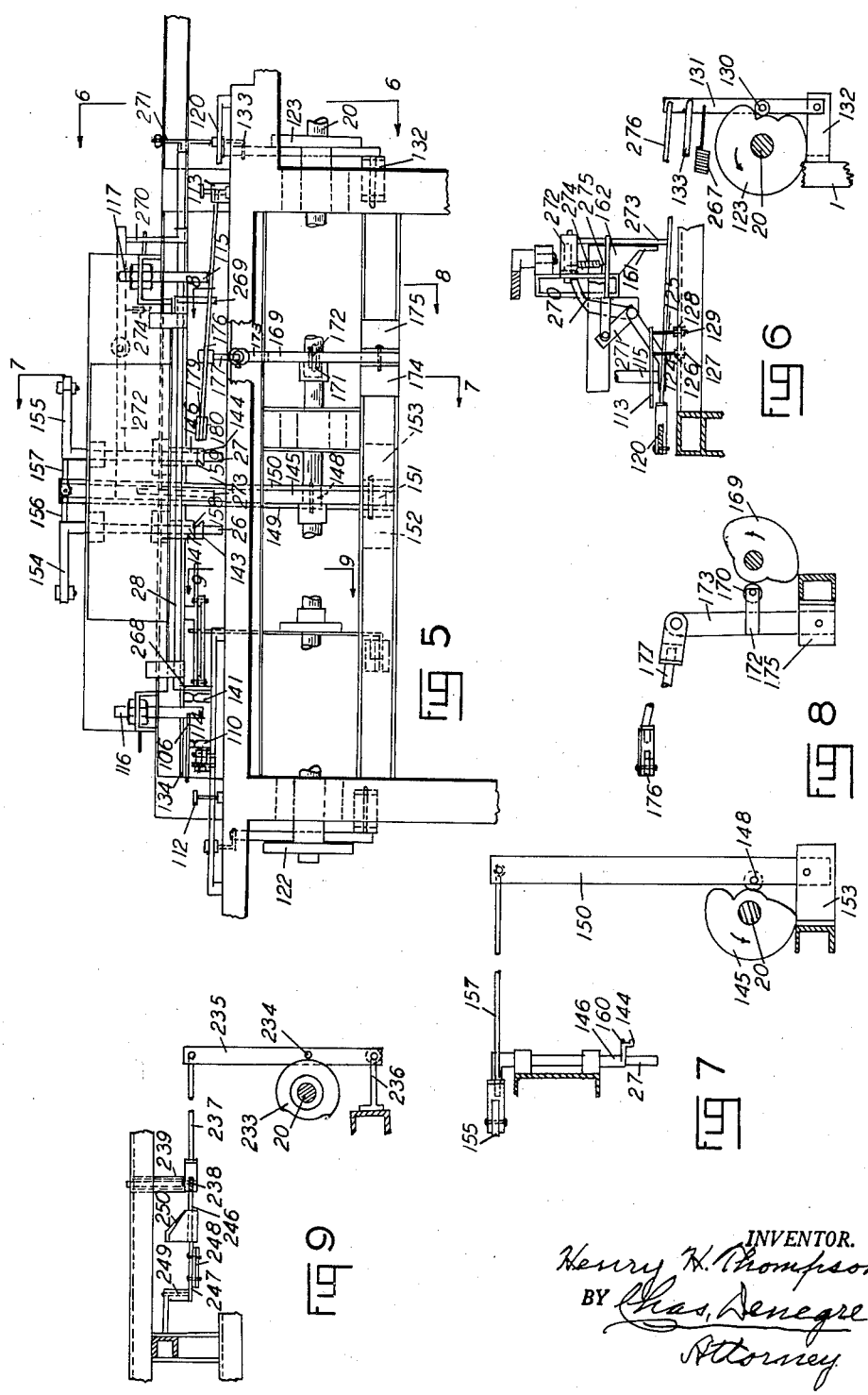
INVENTOR.
Henry H. Thompson
BY Chas. Denegre
Attorney Jan. 1, 1963   H. H. THOMPSON   3,071,167
MACHINE FOR MAKING WIRE GARMENT HANGERS
Filed Dec. 28, 1959   5 Sheets-Sheet 4

INVENTOR.
Henry H. Thompson
BY Chas. Denegre
Attorney

Jan. 1, 1963 H. H. THOMPSON 3,071,167
MACHINE FOR MAKING WIRE GARMENT HANGERS
Filed Dec. 28, 1959 5 Sheets-Sheet 5

INVENTOR.
Henry H. Thompson
BY Chas. Denegre
Attorney

United States Patent Office 3,071,167
Patented Jan. 1, 1963

3,071,167
MACHINE FOR MAKING WIRE GARMENT HANGERS
Henry H. Thompson, 205 15th Court NW., Birmingham 15, Ala.
Filed Dec. 28, 1959, Ser. No. 862,325
3 Claims. (Cl. 140—81.5)

This invention relates to a machine for making wire garment hangers. It has for its main objects to provide such a machine that will be highly satisfactory for the purpose intended, simple in structure, comparatively cheap to manufacture, easy to operate, and very durable.

Other objects are to provide a simple mechanism for supplying wire blanks for garment hangers from a coil of wire. The wire is pulled through a roller straightener and pushed between shear knives into a V guide which supports the end of wire as it is metered out for a wire blank. The wire is sheared and dropped from the V guide supplying a wire blank to be shaped into a garment hanger.

The wire blank is supplied simultaneously with the operation of shaping a previously supplied wire blank into a garment hanger. The blank is supported above the lugs that shape the pants portion of the hanger until the hanger being made has been ejected from the machine, the blank is then dropped in front of the lugs and bent around studs thereby shaping the pants portion of the hanger. In that the lugs bending the wire around the studs to shape the pants portion of the hanger aligns an arced blank into the plane of the finished garment hanger and in that the feeding mechanism is not dependent on narrow passage guides to function, slightly arced wire blanks do not stop my machine from operating. As the wire is bent to shape the pants portion deflection guides deflect the wire ends under the lugs for bending the wire to complete the shoulder portion of the garment hanger and under the apparatus for shaping the hook portions and under the twisting apparatus, and into position for bending the shoulder portion of the hanger. The lugs for shaping the shoulder portion then bend the wire ends between studs shaping the shoulder portion and positioning the ends for forming the hook and twisting. As the wire is bent to form the shoulder portion deflection guides deflect the long end under the lug that bends the hook and into position for bending the hook. The lug that shapes the hook then bends the wire around the stud making the hook and simultaneously the wire holder that twist the wire ends together is engaged with the wire.

The above described apparatus shaping the garment hanger utilizes bending type actions thereby requiring less power than forming by an anvil and die type action.

The simultaneous action of shaping the hook and engaging the wire holder of the twister mechanism eliminates one cycle of the operation as utilized in other machines.

The hook bending mechanism and the wire holder being mounted on the same frame are then rotated to twist the wire together. The bending lugs and wire holder are then disengaged from the wire and the finished garment hanger is ejected downward.

The use of deflection guides to deflect the wire ends out of the plane of the finished garment hanger in conjunction with the hook forming and twisting apparatus, which is in the same plane as the finished garment hanger immediately prior to ejection and immediately after forming operations are completed, eliminate the necessity of bringing or moving the apparatus which performs these functions into and out of position.

Figure 10:
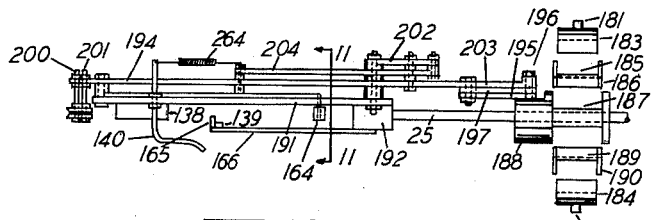
Figure 11:
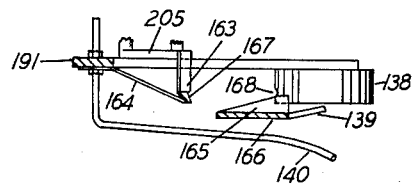
Figure 12:
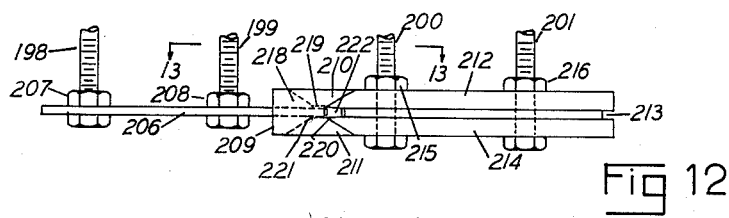
Figure 13:
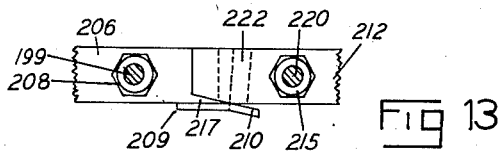
Figure 14:
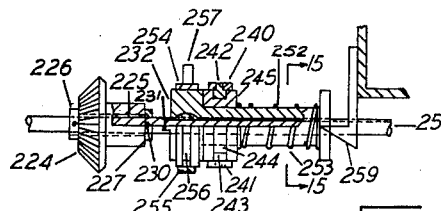
Figure 15:
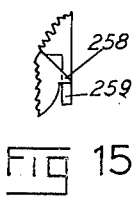
Figure 16:
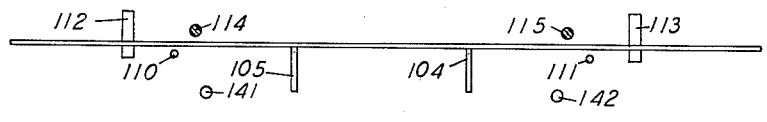

By referring generally to the drawings it will be observed that FIG. 1 is a plan view of a machine incorporating the invention. FIG. 2 is a fragmentary front elevation view showing the wire feeding mechanism with certain parts being in section. FIG. 3 is a fragmentary sectional view taken on line 3—3 of FIG. 2 and shows the shear operating mechanism. FIG. 4 is a fragmentary sectional view taken on line 4—4 of FIG. 2 and shows the mechanism that operates opening and closing the wire guide trough. FIG. 5 is a fragmentary front elevational view showing the mechanisms that make all bends to shape the garment hanger, that engages and disengages the twisting mechanism, and that ejects the garment hanger from the machine. FIG. 6 is a fragmentary sectional view taken on line 6—6 of FIG. 5 and shows the mechanism that operates the lugs for bending the pants portion of the garment hanger and the mechanism that ejects the garment hanger from the machine. FIG. 7 is a fragmentary sectional view taken on line 7—7 of FIG. 5 and shows the mechanism that bends the shoulder portion and holds the wire ends while twisting. FIG. 8 is a fragmentary sectional view taken on line 8—8 of FIG. 5 and shows the mechanism that operates the lug forming the hook portion of the garment hanger and simultaneously engaging the wire holder that twist the wire together. FIG. 9 is a fragmentary sectional view taken on line 9—9 of FIG. 5 and shows the mechanism that operates the twisting mechanism. FIG. 10 is an enlarged elevational view of the mechanism that forms the hook and engages the holder for twisting. FIG. 11 is a fragmentary sectional view taken on line 11—11 of FIG. 10 showing the hook wire deflections guides. FIG. 12 is an enlarged front elevational view showing the wire holder, in the closed position. FIG. 13 is a fragmentary sectional view taken on line 13—13 of FIG. 12 showing a plan view of the wire holder. FIG. 14 is a detail fragmentary sectional view of the mechanism that transmits angular motion to perform the twist. FIG. 15 is a fragmentary view taken on line 15—15 of FIG. 14 showing the twisting mechanism stop. FIGS. 16 through 20 are diagrammatic views illustrating the formation of a hanger.

By referring to the drawings in detail it will be seen that the machine comprises a frame 1, which may be fabricated from structural steel, to which shaft 20 is journaled in bearings 2, 3 and 4, shaft 21 is journaled in bearings 5 and 6, shaft 22 is journaled in bearing 7, shaft 23 is journaled in bearings 8 and 9, shaft 24 is journaled in bearings 10 and 11, shaft 25 is journaled in bearings 12 and 13, shaft 26 is journaled in bearings 14 and 15, shaft 27 is journaled in bearings 16 and 17, shaft 28 is journaled in bearings 18 and 19. Power is supplied to the machine through a V belt to pulley 29 from any suitable source. The V belt and source of power are not shown.

Referring now to FIG. 1 and FIG. 2. Pulley 29 is secured to shaft 21 but not secured to shaft 22 that butts end to end with shaft 21. Angular rotation is transmitted from pulley 29 by projection 30 to projection 31 on collar 32. Collar 32 is keyed to shaft 22 in slot 55 so as to allow transitory movement but not angular motion and thereby transfers angular rotation to shaft 22 and in turn to gear 33 which is secured to shaft 22. Gear 33 is constantly engaged with gear 34 which is secured to shaft 24 thereby transferring angular rotation to shaft 24 and to gear 35 and feed roll 36 which are also secured to shaft 24. Gear 35 transmits angular rotation in the opposite direction to shaft 23 and feed roll 37 which is secured to shaft 23 through gear 38 which is secured to shaft 23. Wire is pinched between feed rolls 36 and 37 by pressure from springs 39 and 40 acting on shaft 23 journaled in bearing 9 through channel 56 to which bearing 9 journal is bolted and adjusting nuts 41 and 42 secured to the frame 1 by studs 43 and 44. Wire is prevented from sliding out from between the feed rolls by indentations 50 and 51. When feed rolls 36 and 37 rotate in opposite angular direction wire is pulled through roller straightener 45 and pushed through hole 82 and between shear knives 46 and 47. V trough with sides 48 and 49 supports the wire as it is metered out. Feed rolls 36 and 37 are constructed so the proper length of wire is supplied when shaft 22 is rotated one less revolution than is required of shaft 21 to rotate shaft 20 one complete revolution through chain 52. Chain 52 rides on sprocket 54 secured to shaft 20. Cam 57 is secured to shaft 20. Cam 57 actuates bar 58 and in turn shaft 59 and bar 60 which are secured together and pivotally mounted to frame 1 by bracket 61. Bar 60 has pins 62 mounted in its free end for engagement in slot 63 formed in collar 32. Bar 60 is actuated by cam 57, collar 32 and in turn projection 31 are moved away from pulley 29 and disengage projection 31 and 30. As cam 57 continues to rotate bar 58 returns to its previous position by pressure of spring 64 and in turn projection 31 is returned to a position in which it will engage projection 30. Shaft 21 rotates one complete revolution during the disengagement of projection 30 and 31 during which time shaft 22 and in turn feed rolls 36 and 37 have no angular rotation.

Shear knife 47 is actuated by cam 65 by actuating roller follower 67 which is secured between bars 68 and 69. Bars 68 and 69 are secured to spacer 70 at the end that is pivotally mounted to brackets 71 and 72 which are secured to frame 1. The free end is connected to the bar 73 by connecting rod 74. Bar 73 is pivotally mounted to projections 75 and 76 of bracket 77 which is secured to frame 1, and support 78. Bar 73 is pivotally mounted so as to form a lever with the long end being connected to connecting rod 74 and the short end provided with adjustment bolt 79 secured in threads provided in bar 73 in a plane perpendicular to that of a plane through the axis of pivot acting against rod 80. Locking nut 81 is provided on bolt 79. As adjustment bolt 79 acts against rod 80, rod 80 forces shear knife 47 toward shear knife 46. Shear knife 47 and rod 80 operate in slide guide 83 which is secured to bracket 77. Shear knife 46 is held by bolts 84 and 85 that screw into guide 86 that is secured to bracket 77. Adjustment bolt 87, which screws into tie plate 88, is a stop for bar 73. Adjustment bolt 87 is provided with lock nut 89. After shear knife 47 advances toward shear knife 46 and shears a wire blank, springs 90 and 91 return the shear mechanism to its original position. Spring 90 is held by projection 92 secured to slide guide 83 and projection 93 secured to shear knife 47. Spring 91 is secured at one end to the frame 1 and at the other end to an appropriate place on bar 73. End stop 103 stops the wire blank after being severed.

After the wire has been severed cam 66 actuates the linkage that opens side 48 opening the V trough allowing the wire blank to drop. This function is performed by cam 66 actuating projection 94 secured to the lower end of bar 95. Bar 95 is pivotally mounted centrally by bracket 96 which is secured to frame 1. The upper end of bar 95 is connected to the upper end of bar 97 by connecting rod 98. Side 48 of the V trough is pivotally mounted on projections 99 and 100, which are secured to frame 1, by projection 101 and lower end of bar 97 which are secured to side 48. Spring 102 which is secured at one end to frame and at the other end to connecting rod 98 returns the mechanism to its original position. End stop 103 and bracket 77 correctly position the wire blank axially and supports 104 and 105 guide the wire blank to correct position prior to shaping as the wire blank drops from the V trough.

Supplying a wire blank as described above is performed as a previously supplied wire blank is shaped into a garment hanger. When the wire blank is dropped from the V trough it stops on rests 106 and 107 (FIGS. 1 and 5) which are secured to bars 108 and 109 respectively. Rests 106 and 107 are constructed so as to be level with the top of lugs 110 and 111. The hanger is ejected from the machine and rests 106 and 107 are in the position as shown in FIG. 1. As rests 106 and 107 were approaching the position shown, the wire blank in the position described above is dropped to rests 112 and 113 which positions the wire blank between lugs 110 and 111 and tapered ends 114 and 115 of lugs 116 and 117 respectively (refer to FIGS. 2, 4, 5, 6 and 16). Rest 112 and 113 are provided with studs that are secured to frame 1 by nuts which allow the rests to be adjusted. FIG. 6 shows this arrangement for rest 113 with attached studs 124 and 125 secured to frame 1 by nuts 126, 127, 128 and 129. Lugs 110 and 111 are secured to bar 108 and 109 respectively. Bar 108 is pivotally mounted to the free ends of bars 118 and 119 and bar 109 is pivotally mounted to the free ends of bars 120 and 121. The opposite ends of bars 118, 119, 120 and 121 are pivotally secured to frame 1. This mechanism guides lugs 110 and 111 around tapered ends 114 and 115 respectively when bars 118 and 120 are rotated through an arc (refer to FIGS. 1 and 17). Bars 118 and 120 are actuated through an arc by cams 122 and 123 which are secured to shaft 20 (refer to FIGS. 1, 5 and 6). The mechanisms actuated by cams 122 and 123 are the same with the exception that cam 122 is designed to slightly lead cam 123 to the extent that the long shank of wire blank ends up on top of the short shank after the pants portion of the hanger has been formed (refer to FIG. 17). Cam 123 actuates roller follower 130 which is secured centrally to bar 131. Bar 131 is pivotally mounted at one end to bracket 132 which is secured to frame 1. The free end of bar 131 is connected to bar 120 by connecting rod 133 which pulls bar 120 through an arc. As bars 118 and 120 are pulled through an arc lugs 110 and 111 engage the wire blank. Lugs 110 and 111 are provided with indentations, as shown by indentation 134 on lug 110 in FIG. 5, which prevent the wire blank from slipping on the lugs. As lugs 110 and 111 bend the wire blank around the tapered ends 114 and 115 of lugs 116 and 117 respectively the wire bows against supports 104 and 105. As the lugs continue to bend the wire blank the ends strike deflection guides 135 and 136 which deflect the wire ends down. The bowed pants portion is prevented from slipping up supports 104 and 105 by projections, as shown by projection 137 in FIG. 4. As lugs 110 and 111 continue to bend the wire blank the long end passes under lug 138 and in between guides 139 and 140 (refer to FIGS. 1, 10, 11 and 17) as it continues to shaft 26. The short end passes under guide 140 as it continues to shaft 27. As lugs 110 and 111 bend the wire ends to contact with the lower ends of shafts 26 and 27 respectively, lugs 141 and 142 which are secured centrally to bars 119 and 120 respectively engage the pants portion of the wire and bend the pants portion to remove the bow.

As the long end of the wire blank is bent into the lower end of shaft 26 the wire slides off of guide 135, which had deflected it downwardly, and spring tension of the wire end pulls the wire up between shaft 26 and lug 143. In like manner the short end of the wire blank springs up between lug 144 and shaft 27 (refer to FIGS. 1, 5, 7 and 17).

The wire ends are now in position to make the shoulder bends. Lugs 143 and 144 are secured to shafts 26 and 27 by brackets 147 and 146 respectively (refer to FIGS. 5 and 7). Cam 145 secured to shaft 20 operates lugs 143 and 144 to perform the shoulder bends by actuating roller follower 148 which is centrally secured to bars 149 and 150. The lower end of bars 149 and 150 are spaced by spacer 151 and pivotally mounted to brackets 152 and 153 which are secured to the frame. The free ends of bars 149 and 150 are connected to the free ends of bars 154 and 155 pivotally by connecting rods 156 and 157 respectively (refer to FIGS. 1, 5 and 7). The fixed ends of rods 154 and 155 are secured to the upper ends of shafts 26 and 27 respectively. Motion actuated thereby from cam 145 is transmitted to lugs 143 and 144 which bends the wire blank ends to the position shown in FIG. 18. Lugs 143 and 144 are provided with indentations that position the wire ends and holds the wire ends during the twisting operation. These indentations are llustrated by 158, 159 and 160 (refer to FIGS. 5 and 7).

Figure 18:
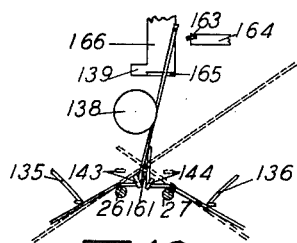

As the wire is being bent to the position shown in FIG. 18 lugs 143 and 144 pull the wire ends around shafts 26 and 27. This action bows the wire out against the ends of deflection guides 135 and 136 which stops the bowing action. As the lugs continue to bend the wire the ends strike projection 161 (refer to FIGS. 1, 6 and 18). Projection 161 is on one end of bar 162 which is secured to the frame. As lugs 143 and 144 continue to rotate in an arc relative to shafts 26 and 27 respectively the wires are bent to approximately 90 degree angles being forced between shaft 26 and projection 161 and shaft 27 and projection 161.

During the above described bend the long end of the wire blank is deflected under the hook bending lug 163 by deflection guide 164 and into position for bending into a hook by deflection guide 165 (refer to FIGS. 1, 10, 11 and 18). Guides 165 and 139 are secured to ends of bar 166.

The hook is formed by lug 163 bending the wire engaged in indentation 167 around lug 138. The wire is held in position on lug 138 by indentation 168 (refer to FIGS. 11 and 19).

The action of forming the hook and engaging the wire holder is performed by cam 169 which is secured to shaft 20. Cam 169 actuates roller follower 170 which is secured to one end of bars 171 and 172. Bars 171 and 172 are secured at the other end to bar 173 centrally. The bottom end of bar 173 is pivotally connected at the lower end to brackets 174 and 175. The free end of bar 173 is pivotally connected centrally to bar 176 by connecting rod 177 (refer to FIGS. 1, 5 and 8). Referring now to FIG. 1 the right end of bar 176 is pivotally connected to bar 178. The other end of bar 178 is pivotally connected to the frame. The left end of bar 176 is secured to bars 179 and 180 (refer to FIGS. 1 and 5). The left end of bars 179 and 180 are pivotally connected to studs 181 and 182 (refer to FIGS. 1 and 10). Halve round 183 is held in slot 185 of halve bearing 186 and in slot 187 of collar 188 and halve round 184 in slot 189 of halve bearing 190 and in slot 187 of collar 188 by bars 179 and 180 (refer to FIGS. 1, 5 and 10). Collar 188 slides freely on shaft 25.

Bar 191 is the frame of the hook forming and wire holding mechanism for twisting and is secured to projection 192 which is secured to the end of shaft 25 (refer to FIGS. 1 and 10). Referring now to FIG. 1 bars 193 and 194 are pivotally connected centrally to bar 191 as shown. The short free end of bar 193 is pivotally connected to the free end of bar 195. The other end of bar 195 is pivotally connected to stud 196. The short free end of bar 194 is pivotally connected to the free end of bar 197. The other end of bar 197 is pivotally connected to stud 196. The long free end of bar 193 is secured to bolts 198 and 199 by nuts which allow bolts 198 and 199 to be adjusted. The long free end of bar 194 is secured to bolts 200 and 201 by nuts which allow bolts 200 and 201 to be adjusted (refer to FIGS. 1, 10 and 12).

Bar 202 is pivotally connected at one end to bar 191 axially with pivotally connected bar 193. Bar 203 is pivotally connected at one end to stud 196 and pivotally connected at the other end centrally to bar 202. The free end of bar 202 is pivotally connected to one end of bar 204 which is pivotally connected at the other end near the free end of bar 205. The fixed end of bar 205 is pivotally connected to bar frame 191. Lug 163 is connected at the free end of bar 205 (refer to FIGS. 1, 10 and 11).

The wire holding head which holds the wire while twisting is shown in detail in FIGS. 12 and 13. As shown in FIG. 12 the left side of the wire holding head consist of bolts 198 and 199 which are secured to bar 206 by nuts 207 and 208. Plate 209 is secured to bar 206. Plate 209 has at its right end two projections 210 and 211 which form a V slot as shown in FIG. 12. These two projections are bent forward as shown in FIG. 13.

The right side of the wire holding head consist of bolts 200 and 201 which are secured to bars 212 and 214 and spacer 213 by nuts 215 and 216. The left front corners of bars 212 and 214 are tapered as illustrated by taper 217 shown in FIG. 13. The bottom left end of bar 212 is tapered so as to form two separate planes. Taper 218 forms approximately a 30-degree angle relative to the horizontal whereas taper 219 forms a very small angle relative to the horizontal. The top left end of bar 214 is tapered to form two separate planes similar to the tapers on the bottom of bar 212. These tapers are 220 and 221 (refer to FIG. 12).

In the closed position the wire holder head forms slot 222 in which the wire ends are held for twisting. The sides of this slot are formed by the right end of bar 206 and the left end of spacer 213. The top is formed by tapered plane 219 of bar 212 and the bottom is formed by tapered plane 221 of bar 214 (refer to FIGS. 12 and 13).

Figure 19:
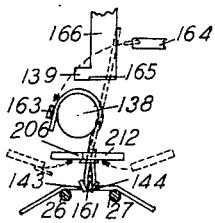

The simultaneous action of forming the hook and engaging the wire holder for twisting is illustrated by FIG. 19.

The remaining action required to finish shaping the hanger is twisting. The wire holder mechanism was engaged as described above and twisting the wire is accomplished by rotating shaft 25 which is secured to the hook forming and wire holding mechanism.

Gear 223 is secured to the left end of shaft 21 and constantly meshed with gear 224. Gear 224 is secured to bearing 225 which encompasses part of shaft 25. Bearing 225 allows free angular rotation of gear 224 relative to shaft 25. Bearing 225 and in turn gear 224 is prevented from sliding on shaft 25 by collars 226 and 227. Shaft 25 is prevented from sliding in its journals by collars 228 and 229 (refer to FIGS. 1 and 14). Gear 224 has a projection 230 which is continuously rotating as is gear 224 (referring to FIG. 1 the rotation is in a counter clockwise direction). Projection 230 transmits angular rotation to shaft 25 through projection 231 on collar 232 which is secured to shaft 25 so as to prevent relative angular rotation but allows sliding action (refer to FIGS. 1 and 14).

Projections 230 and 231 are engaged and disengaged by action resulting from cam 233. Cam 233 is secured to shaft 20. Cam 233 actuates follower lug 234 which is secured centrally to bar 235. Bar 235 is pivotally connected at one end to bracket 236 which is secured to frame 1. The free end of bar 235 is pivotally connected centrally to bar 238 by connecting rod 237 (refer to FIGS. 1 and 9). Bar 238 is pivotally connected at one end to bracket 239 which is secured to frame 1. The free end of bar 238 is secured to bars 240 and 241 (refer to FIGS. 1 and 14). The other ends of bars 240 and 241 have pins 242 and 243 respectively which engage in slot 244 of collar 245. Near the end of bar 238 that is pivotally connected to bracket 239 is secured bar 246. The free end of bar 246 is pivotally connected centrally to bar 247 by connecting bar 248. Bar 247 is pivotally connected at one end to bracket 249 which is secured to frame 1. The other end of bar 247 is secured to cam slide 250. One end of spring 251 is connected near the free end of bar 247 and the other end to the frame.

As shown most clearly in FIG. 14, collar 245 fits freely on the slotted portion 252 of collar 232. Also fitted on slotted portion 252 is compression spring 253 which acts against the rear flange of collar 232 and the rear of collar 245. Bracket 254 is secured to the front flange of collar 232 by bolt 255. Bracket 254 is provided with slot 256 so that projection 257 can be adjusted to various positions relative to its relationship with collar 232. The rear flange of collar 232 has a projection 258 which is held against projection 259 that is secured to the frame by action of tension spring 260 when the twisting function is not being performed. One end of tension spring 260 is secured to the frame and the other end to bracket 261 which is connected to the free end of bar 262 so as to rotate freely. The fixed end of bar 262 is secured to shaft 25.

The twisting mechanism as shown in FIGS. 1, 9, 14 and 15 is in an inoperative position. Cam 233 is so fixed on shaft 20, and projection 230 so positioned relative to the cam action through chain 52 that the twisting action is started after the simultaneous action of forming the hook and engaging the wire holder. This action is started by cam 233 allowing spring 251 to pull projection 231 forward into the plane of rotating projection 230 through the mechanism described above. This action also pulls slide cam 250 out of the radius of projection 257. Cam 233 maintains the above position for approximately one and a half revolutions of shaft 25. Cam 233 then returns the mechanism to the position shown in FIG. 1 except collar 232 remains forward with projections 230 and 231 still engaged in that compression spring 253 is not strong enough to disengage projections 230 and 231. Shaft 25 continues rotating until it has completed slightly more than two revolutions at which time projection 257 acts against slide cam 250 and forces collar 232 to disengage projection 231 from projection 230.

The angular rotation required in excess of two revolutions depends on the physical characteristics of the wire being shaped into a hanger. Collar 232 is adjustable to correct for this condition.

The spring action of the hanger and the spring action of spring 260 return the twisting mechanism to the horizontal and projection 258 in contact with projection 259 as shown in FIGS. 1, 14 and 15.

After the twisting operation has been completed cam 169 allows the hook forming mechanism and wire holder to return to the position shown in FIG. 1 by action of springs 263 and 264.

Figure 17:
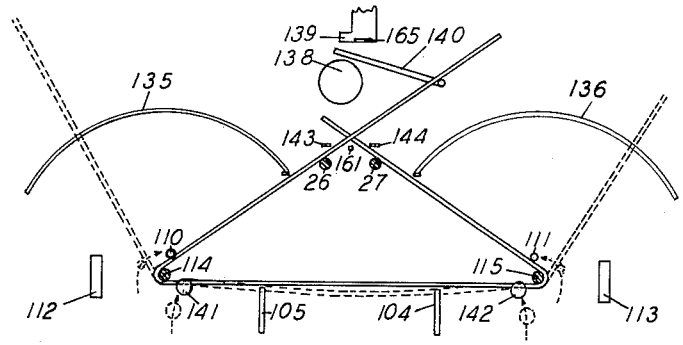

Simultaneously with the above operation, cam 145 allows spring 265 to return the mechanism that operates projections 143 and 144 to the position shown in FIGS. 1 and 17.

After the above mechanism disengages from the hanger cams 122 and 123 allow springs 266 and 267 to return lugs 110 and 111 to the position shown in FIG. 1. While this mechanism is returning to the position shown the hanger is ejected by action of spring 267.

Shaft 28 has bars 268 and 269 secured to it and projecting out adjacent to studs 116 and 117 respectively. Bars 270 and 271 are also secured to shaft 28 as shown in FIG. 1. Bar 270 acts as a cam as it rotates counterclockwise (see FIG. 6) forcing the right side of bar 272, as shown in FIG. 1, up. Bar 272 is pivotally mounted centrally to frame 1. At the left end of bar 272 is projection 273. At the right side centrally of bar 272 is connected one end of spring 274. The other end of tension spring 274 is secured to projection 275 which is secured to the frame.

Tension spring 274 keeps the right end of bar 272 in contact with bar 270 (refer to FIGS. 5 and 6).

Figure 20:
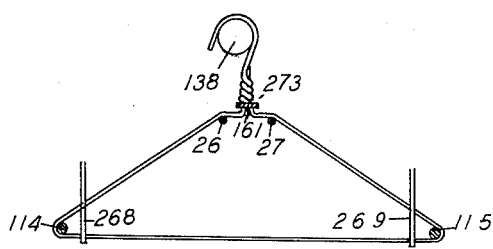

The free end of bar 271 is pivotally connected to the free end of bar 131 by connecting rod 276. As cam 123 allows bars 268, 269 and 272 to return to the position shown in FIGS. 5 and 6 pressure is applied by bars 268 and 269 and projection 273 at points on the hanger as shown in FIG. 20 forcing the hanger down and free from the tapered ends of projections 116, 117 and 161. The hanger is guided out to the front by sliding on the pants bar on guides 277 and 278 which are secured to the frame as shown in FIG. 1.

From the foregoing it will appear that the machine is adapted for making garment hangers in a practical and efficient manner without loss of time and material. It may be made of any material suitable for the purpose, but I prefer to use good grades of metal; also it may be made in different sizes and capacities.

While I have shown and described the preferred embodiment of my invention, I do not wish to limit same to the exact and precise details of structure, and I reserve the right to make all modifications and changes so long as they remain within the scope of the invention and the following claims.

Having described my invention I claim:

1. In a machine for making wire garment hangers comprising, a main frame, one cam shaft secured to the main frame, means for rotating said cam shaft, two mechanisms that effect the bending of a wire blank into triangular shape, each of said two mechanisms comprised of a bar pivotally connected to the frame, a cam follower secured to said bar, a spring holding said cam follower in contact with a cam secured to said cam shaft, a connecting rod pivotally connected at one end to the free end of said bar to which is secured a cam follower, said connecting rod pivotally connected at the other end centrally to a bar in a system of three pivotally connected bars, said bar to which the connecting rod is pivotally connected centrally being pivotally connected at one end to the frame and pivotally connected at the other end to the end of a second bar, said second bar having secured to it a wire rest and a groove indented upturned lug, said second bar being pivotally connected centrally by the end of a third bar, the other end of said third bar pivotally connected to the frame, said third bar having secured centrally a groove indented upturned lug, said wire rest secured to said second bar of each mechanism supporting a wire blank until it is allowed to be gravity fed by said wire rests to a position for bending, said two systems of three pivotally connected bars arranged in a manner to allow a mechanism of pivotally connected bars to eject a finished garment hanger while the wire blank is allowed to be gravity fed, said groove indented upturned lugs secured in a position to said second and third bar in each system of three pivotally connected bars to bend a wire blank into triangular shape around two downward projecting lugs secured to the frame, two deflection guides secured to the main frame deflecting the wire ends, as the bends are being made, under the downward projecting lugs that make the following bends.

2. In a machine for making wire garment hangers comprising, a main frame, one cam shaft, means for rotating said cam shaft, a cam follower secured to a bar pivotally connected to the frame, a cam secured to said cam shaft by which said cam follower is actuated, a connecting rod, one end of said connecting rod pivotally connected to the free end of said bar pivotally connected to the frame and to which a cam follower is secured, the other end of said connecting rod pivotally connected centrally to a bar, said bar pivotally connected centrally by a connecting rod pivotally connected at one end to the free end of a bar pivotally connected to the frame and the other end of said bar pivotally connected centrally by a connecting rod secured to two bars, said two bars forming a fork, said fork pivotally connected to and securing halve rounds encompassing bearings around a collar, said collar freely encompassing a shaft, said shaft journaled to the main frame in a manner to allow angular rotation only, a U-shaped bar frame secured to one end of said shaft, two bars pivotally connected centrally to said U-shaped bar frame, one end of said two bars pivotally connected centrally to said U-shaped bar frame pivotally connected by connecting bars pivotally connected to said collar encompassing said shaft, the other end of said two bars pivotally connected centrally to said U-shaped bar frame having secured adjustably to each bar one-half of a wire holder for twisting, a bar pivotally connected at one end to said U-shaped bar frame, said bar pivotally connected at one end to said U-shaped bar frame connected centrally by a connecting bar, said connecting bar pivotally connected at the other end to said collar freely encompassing said shaft, the other end of said bar pivotally connected at one end to said U-shaped bar frame pivotally connected at the other end to a connecting bar, said connecting bar pivotally connected at the other end centrally to a bar, said bar pivotally connected centrally by a connecting bar pivotally connected at one end to said U-shaped bar frame and to which is secured at the other end a downward projecting lug, a downward projecting lug secured to the U-shaped bar frame, said downward projecting lug secured to the bar pivotally connected to the U-shaped bar frame in conjunction with one-halve of the wire holder for twisting when actuated by said cam effecting the bending of a wire blank around said downward projecting lug secured to the U-shaped bar frame to form a hook and simultaneously engage the wire holder for twisting with the wire blank.

3. In a machine for making wire garment hangers comprising, a main frame, one cam shaft journaled to the main frame, a shaft journaled to the main frame parallel to the cam shaft, said shaft held in proper angular relationship with the cam shaft by a sprocket secured to each shaft connected by a chain, a V-belt pulley and a bevel gear secured at opposite ends of said shaft journaled to the main frame parallel to the cam shaft, said V-belt pulley for receiving power to run the machine, said bevel gear in contact with another bevel gear encompassing a bearing encompassing a shaft, said bevel gear encompassing a bearing encompassing a shaft having a projection on the face of the hub, said bevel gear encompassing a bearing encompassing a shaft secured to said shaft in a manner to allow angular rotation only relative to the shaft, said shaft encompassed by a bevel gear journaled to the main frame in a manner to allow angular rotation only relative to the main frame, said shaft encompassed by a beveled gear having secured at one end a U-shaped bar frame, said U-shaped bar frame being the base for two bars pivotally connected centrally, each of said two bars having secured adjustably at one end one-half of a wire holder for twisting, said shaft having secured at the other end a bar, said bar at its outer end connected to the frame by a spring, a collar encompassing said shaft to which a bevel gear encompasses, said collar encompassing said shaft affixed to said shaft to allow axial motion only, said collar with a projection on the face of one end opposite to the face of said bevel gear having a projection on the hub face, said collar having a flange on both ends, a band to which is fixed a projection, said band adjustably secured to one of the flanges of said collar, a projection fixed to the periphery of the other flange of said collar, a grooved collar freely encompassing a portion between the two flanges of said collar having a flange on both ends, a compression spring between one flange and the grooved collar, bearing type pins pivotally connected to two bars, said two bars forming a fork secured at their common end to an L-shaped bar, said bearing type pins held in the grooved slot of said grooved collar by the fork, said L-shaped bar pivotally connected to the frame, a connecting rod pivotally connected to the L-shaped bar, a connecting bar pivotally connected to the L-shaped bar connected at the other end pivotally centrally to a bar pivotally connected at one end to the frame, said bar pivotally connected at one end to the frame having secured at the other end a slide type cam, said connecting rod connected to the L-shaped bar in conjunction with a spring transmitting cam action in a timed manner positioning the grooved collar and the slide type cam to shuttle the collar with a projection on one face into the path of the projection on the hub of said bevel gear encompassing said shaft with a U-shaped bar frame secured to one end to rotate, said rotation being adjustable, said shaft with a U-shaped bar frame secured to one end and in turn the wire holder for twisting as required for twisting the wire together and to allow angular rotation of the shaft with a U-shaped bar frame secured to one end in the opposite direction to a fixed point controlled by the projection on the periphery of a flange on said collar encompassing said shaft, said projection being actuated in opposite angular direction by spring action applied to the bar secured to the end of the shaft that is encompassed by said collar and stopped by said projection coming in contact with a projection secured to the frame.

References Cited in the file of this patent

UNITED STATES PATENTS

| | | |
|---|---|---|
| 1,777,168 | Jaeger | Sept. 30, 1930 |
| 1,906,741 | Coney | May 2, 1933 |
| 2,035,658 | Lewis | Mar. 31, 1936 |
| 2,081,167 | Brownstein | May 25, 1937 |